United States Patent
Takabayashi et al.

(10) Patent No.: US 7,019,302 B2
(45) Date of Patent: Mar. 28, 2006

(54) RADIATION DETECTOR, SCINTILLATOR PANEL, AND METHODS FOR MANUFACTURING SAME

(75) Inventors: Toshio Takabayashi, Hamamatsu (JP); Takuya Homme, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 242 days.

(21) Appl. No.: 10/343,428

(22) PCT Filed: Aug. 3, 2001

(86) PCT No.: PCT/JP01/06701

§ 371 (c)(1),
(2), (4) Date: Jun. 12, 2003

(87) PCT Pub. No.: WO02/12920

PCT Pub. Date: Feb. 14, 2002

(65) Prior Publication Data

US 2004/0089813 A1   May 13, 2004

(30) Foreign Application Priority Data

Aug. 3, 2000   (JP) .............................. 2000-235879

(51) Int. Cl.
  *G01T 1/24* (2006.01)
(52) U.S. Cl. ................................. 250/370.11
(58) Field of Classification Search ............ 250/370.11
  See application file for complete search history.

(56) References Cited

U.S. PATENT DOCUMENTS

| 5,912,465 A | 6/1999 | Kobayashi et al. | 250/370.9 |
| 6,262,422 B1 | 7/2001 | Homme et al. | 250/370.11 |
| 6,278,118 B1 | 8/2001 | Homme et al. | 250/370.11 |
| 6,323,891 B1 * | 11/2001 | Kitani et al. | 347/263 |
| 6,429,414 B1 * | 8/2002 | Spahn | 250/208.1 |
| 6,531,225 B1 | 3/2003 | Homme et al. | 428/408 |
| 2002/0005489 A1 | 1/2002 | Kasuyama et al. | 250/368 |

FOREIGN PATENT DOCUMENTS

| EP | 0 762 503 A2 | 3/1997 |
| EP | 0 762 503 A3 | 3/1997 |
| EP | 0 903 590 | 3/1999 |
| EP | 0 932 053 | 7/1999 |
| EP | 1 024 374 | 8/2000 |
| JP | 63-243781 | 10/1988 |
| JP | 1-114780 | 8/1989 |
| JP | 2-52995 B2 | 11/1990 |
| JP | 9-153606 | 6/1997 |
| JP | 11-345956 | 12/1999 |
| WO | 99/38031 | 7/1999 |
| WO | 99/66345 | 12/1999 |
| WO | 00/36436 | 6/2000 |

\* cited by examiner

*Primary Examiner*—Constantine Hannaher
(74) *Attorney, Agent, or Firm*—Drinker Biddle & Reath LLP

(57) ABSTRACT

An image sensor panel (2) has a light receiving section (22) consisting of a plurality of photoelectric detectors (21) two-dimensionally arranged close to corners on a substrate (20). The image sensor panel (2) has a scintillator (3) formed successively from the surface of the light receiving section (22) to sidewall parts (25) close thereto. A screen is enlarged by butting the sidewall parts (25) against each other.

9 Claims, 10 Drawing Sheets

RADIATION DETECTOR, SCINTILLATOR PANEL, AND METHODS FOR MANUFACTURING SAME

TECHNICAL FIELD

This invention relates to a radiation detector and a scintillator panel, and, more particularly, to a radiation detector and a scintillator panel that can be suitably applied to a radiation imaging device constructed by arranging a plurality of image sensors so as to pick up a radiation image having a large image area, and to methods for manufacturing them.

BACKGROUND ART

An X-ray image sensor using a CCD, in place of an X-ray photosensitive film, has been widely employed as an X-ray diagnostic instrument for medical use. In such a radiation imaging system, two-dimensional image data by radiation is obtained as an electrical signal by use of a radiation detector that has a plurality of pixels, and an X-ray image is displayed on a monitor by processing the signal with a processor. A typical radiation detector has a mechanism in which a scintillator is disposed on photodetectors arranged one-dimensionally or two-dimensionally, and incident radiations are transformed by the scintillator into light in a wavelength region to be sensed by the photodetectors, and are detected.

In this type of radiation detector, a yield obtained when manufactured deteriorates proportionately with the enlargement of an image. As a solution to this problem, a technique is known in which a plurality of detectors are arranged to enlarge an image when a large-screen imaging device for use in taking a chest X ray, for example, is produced, as disclosed in JP 09-153606 A. This publication mentions that the yield of each component is prevented from decreasing, and production costs are reduced by combining the components of a light receiving screen smaller than an actual imaging screen together.

DISCLOSURE OF THE INVENTION

However, there is a problem that a scintillator is liable to separate from a boundary (a joint) with an adjoining detector when a plurality of detectors are arranged to make a large screen in this way. This problem causes a concern that the resolution in the vicinity of the joint will decrease or that the scintillator will completely separate therefrom.

It is therefore an object of the present invention to provide a radiation detector and a scintillator panel that are constructed so that resolution in the vicinity of a joint can be prevented from decreasing, and the scintillator can be prevented from separating therefrom when a plurality of detectors are arranged for large-area photography, and to provide methods for manufacturing them.

In order to achieve the object, he radiation detector according to the present invention is characterized by comprising (1) an image sensor panel having a substrate and a light receiving section consisting of a plurality of photoelectric detectors arranged two-dimensionally in the vicinity of at least one side of the substrate, and (2) a scintillator successively extending from a surface of the light receiving section of the image sensor panel to a sidewall close thereto.

On the other hand, a scintillator panel according to the present invention is characterized by comprising (1) a scintillator-forming substrate, and (2) a scintillator that successively extends from a sidewall of at least one side of the scintillator-forming substrate to a predetermined area of a surface of the scintillator-forming substrate.

Since the scintillator successively extends to the sidewall of the substrate (the image sensor panel or the scintillator-forming substrate), the scintillator formed on the substrate surface can be uniformly formed close to the sidewall. That is, the almost uniform scintillator spread to the edge of the substrate can be formed.

In the image sensor panels or scintillator-forming substrates obtained in this way, when the sidewalls where the scintillators are formed are disposed so as to adjacent these sidewalls and fixed to each other, a large-screen radiation detector or a scintillator panel for a large screen can be obtained. According to the present invention, an almost uniform scintillator extending to an edge is formed, and therefore the width of an area low in sensibility that arises at a joint can be controlled to a minimum.

Preferably, the image sensor panel has at least one of a circuit section electrically connected to the photoelectric detectors and a bonding pad between at least one of the other sides that are not adjacent to the light receiving section of the image sensor panel and the light receiving section thereof. Thereby, the readout line of an electrical signal can be easily formed.

Preferably, a moisture-proof protective film covering the scintillator is provided. Thereby, the scintillator can be further effectively prevented from peeling off.

BEST MODE FOR CARRYING OUT THE INVENTION

Figure 1:
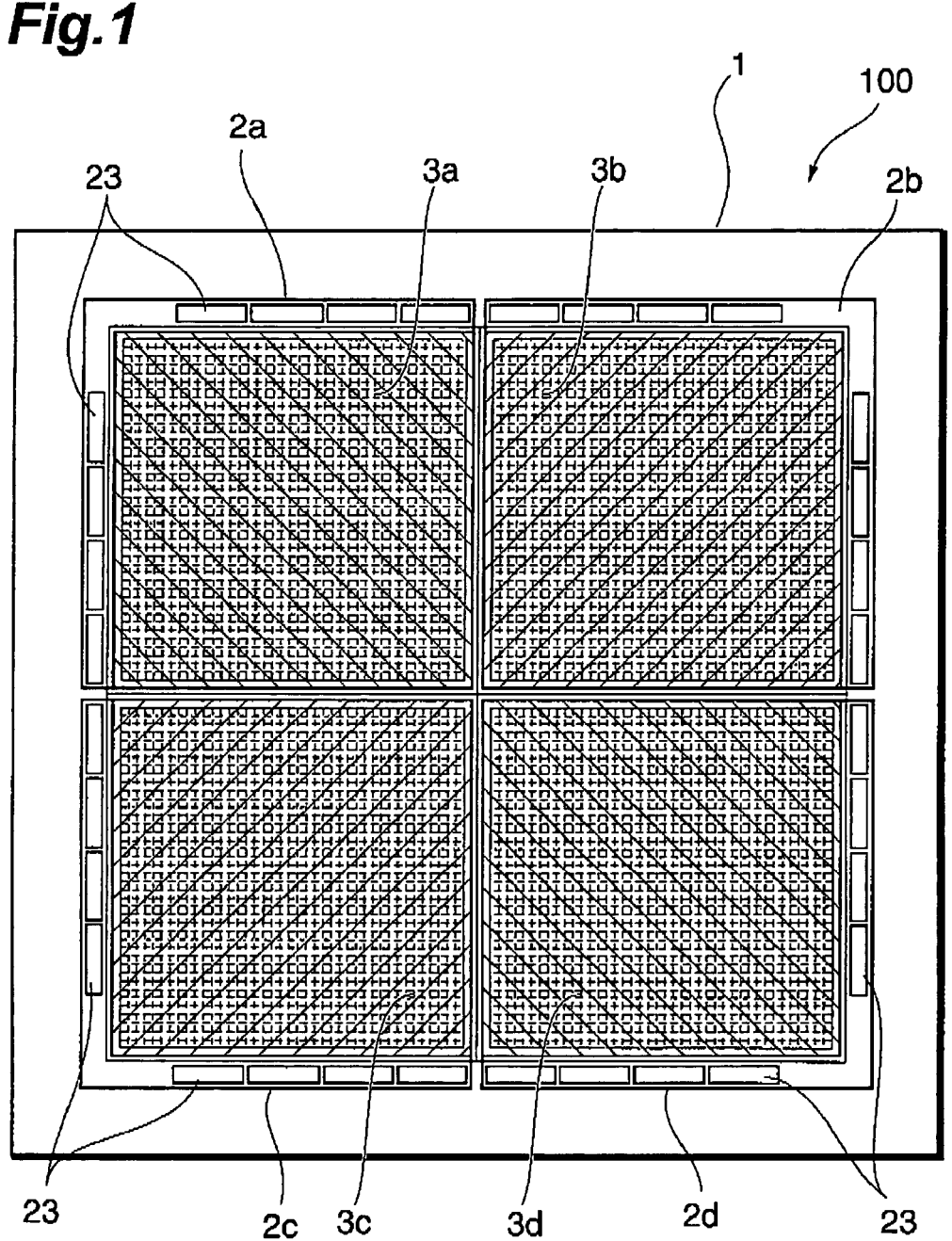
FIG. 1 is a plan view showing an embodiment of the radiation detector according to the present invention.

Preferred embodiments of the present invention will hereinafter be described in detail with reference to the accompanying drawings. To facilitate the comprehension of the explanation, the same reference numerals denote the same parts, where possible, throughout the drawings, and a repeated explanation will be omitted. Additionally, the size and shape of each component in each drawing are not necessarily the same as the actual ones, and some components are magnified in size and in shape in order to facilitate the understanding thereof.

Figure 2:
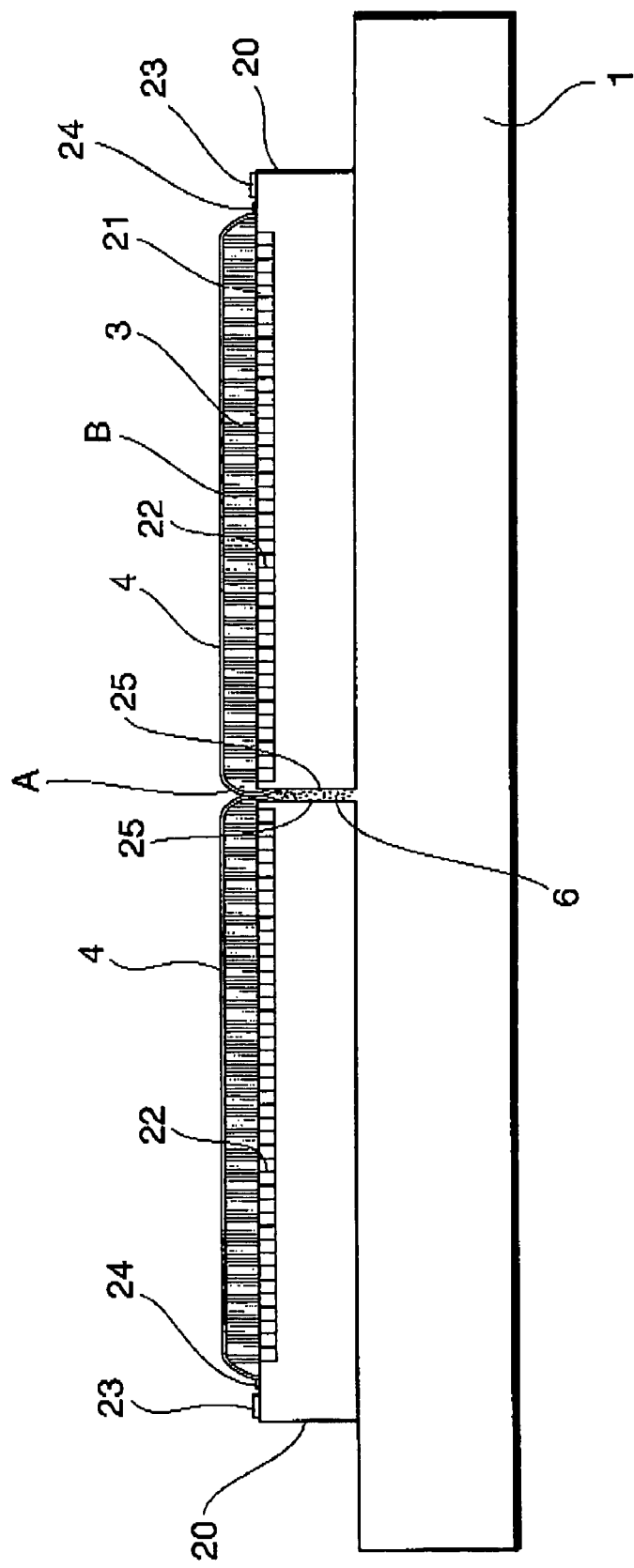
FIG. 2 is a sectional view thereof.

FIG. 1 is a plan view showing an embodiment of the radiation detector according to the present invention, and FIG. 2 is a sectional view thereof. In the radiation detector 100 in this embodiment, four solid-state image sensing devices 2a to 2d that are image sensor panels are disposed on a ceramic base 1 in 2×2 array.

Each solid-state image sensing device 2 is constructed by two-dimensionally disposing photoelectric detectors 21 that perform a photoelectric conversion on a substrate 20 made of, for example, crystal Si. The photoelectric detectors 21 are formed out of photodiodes (PD) or transistors. The part where the photoelectric detectors 21 are arranged is hereinafter referred to as a light receiving section 22. The light receiving section 22 is placed close to two sides extending from a corner of the surface of the substrate 20 (i.e., from an intersection created when the solid-state image sensing devices 2 are combined together in FIG. 1). Each photoelectric detector 21 is electrically connected by a signal line, not shown, to a corresponding electrode pad 23 of a plurality of electrode pads 23 disposed along two adjoining sides of the solid-state image sensing device 2, i.e., along two sides opposite to two sides on the side of the aforementioned corner through a shift register 24.

Columnar scintillators 3a to 3d that transform incident radiation into light in a wavelength range to which the photoelectric detector 21 is sensitive are each formed on the light receiving section 22 of the solid-state image sensing device 2. Various materials can be used for the scintillator 3, and, preferably, Tl-doped CsI that has excellent luminous efficiency is used. The scintillator 3 successively extends from the upper part of the light receiving section 22 of the solid-state image sensing device 2 to a sidewall 25 of the substrate 20 of the two sides at the corner to which the light receiving section 22 is close. Therefore, the thickness (position "A") of the scintillator 3 formed on the photoelectric detector 21 that is closest to the end of the light receiving section 22, i.e., closest to the sidewall 25 is almost the same as the thickness (position "B") of the scintillator 3 formed on the photoelectric detector 21 at the other parts, especially at the center part.

Further, a protective film 4, with which the scintillator 3 is covered, which extends from between the electrode pad 23 of each solid-state image sensing device 2 and the shift register 24 to the sidewall 25, and with which the scintillator 3 is sealed up, is formed on each solid-state image sensing device 2. The protective film 4 is radiolucent and is impermeable to water vapor, and, for this film, it is preferable to use, for example, a poly-para-xylylene resin (manufactured by Three Bond Co., Ltd; registered name: Parylene), especially poly-para-chloroxylylene (manufactured by the same company; registered name: Parylene C). A coating film of Parylene has excellent properties suitable as the protective film 4, because it is extremely small in permeability to water vapor and gas, is superior in water repellency and in chemical resistance, is excellent in electric insulation even if it is thin, and is transparent to radiation and visible rays.

The solid-state image sensing devices 2a to 2d are disposed on the base 1 while bringing their corner sides close to the light receiving section into contact with each other and while butting their sidewalls 25 where the scintillator 3 is formed against each other. The portion of the butted sidewalls 25 is glued and fixed by being filled with resin 6. Thereby, the light receiving sections 22 of the solid-state image sensing devices 2 can be disposed as close to each other as possible, and an insensible field where an image cannot be obtained can be narrowed by reducing the gap between the light receiving sections as much as possible. The electrode pad 23 is disposed around the light receiving section 22.

Figure 3:
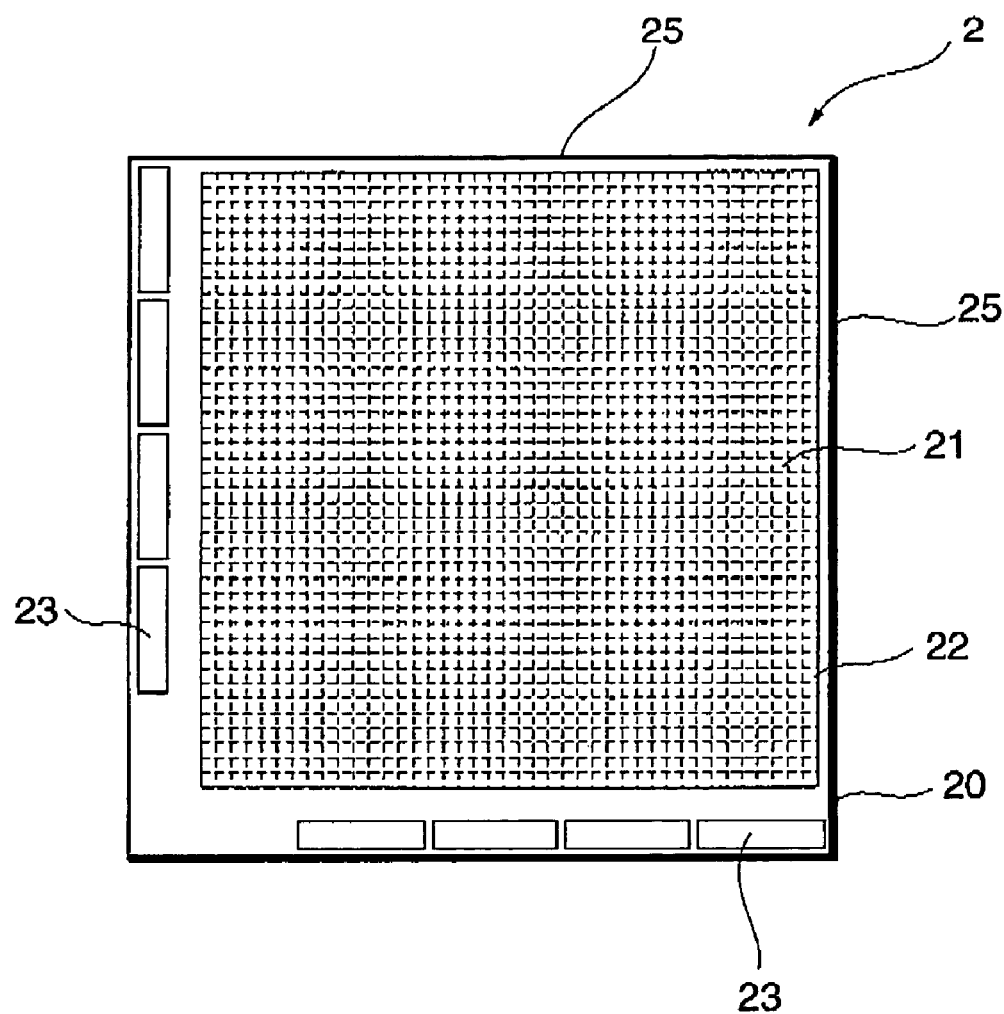
FIG. 3 to FIG. 8 are views for explaining a manufacturing process of the radiation detector of FIG. 1 (i.e., manufacturing method of the radiation detector according to the present invention).
Figure 4:
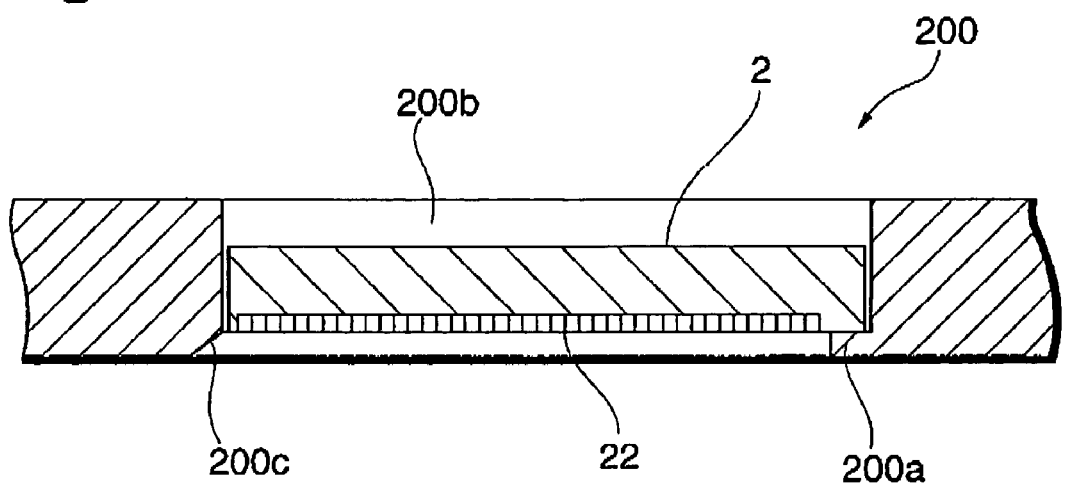
Figure 5:
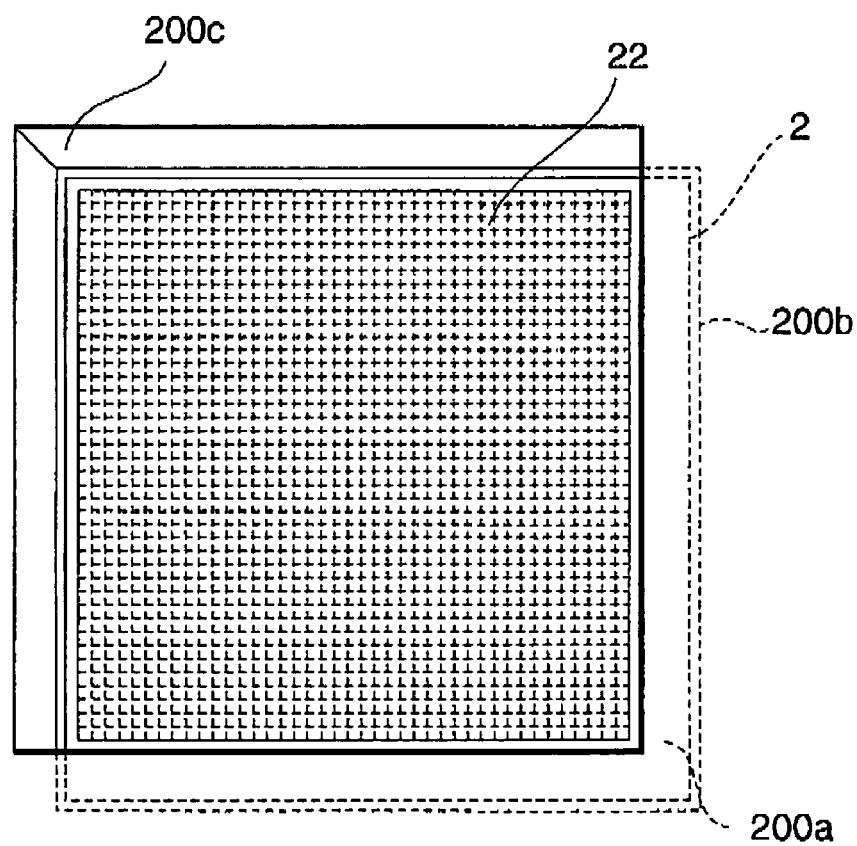

Next, a process of manufacturing the radiation detector 100, i.e., a method for manufacturing the radiation detector according to the present invention will be described in detail with reference to FIGS. 3 to 8. Four solid-state image sensing devices 2 structured as shown in FIG. 3 are first prepared. The solid-state image sensing devices 2 are each set in a vapor-deposition-substrate holder 200. FIGS. 4 and 5 are a sectional view and a view from below, respectively, after being set. When set, the solid-state image sensing device 2 is contained and supported in a containing part 200b by allowing a projection 200a of the vapor-deposition-substrate holder 200 to support an electrode pad 22 provided along two sides thereof as shown in FIG. 4. On the other hand, a notch 200c is formed on the side of the light receiving section 21 of the substrate holder 200 close to the light receiving section 21 of the solid-state image sensing device 2, and the solid-state image sensing device 2 is disposed so that the apex of the sidewall 25 is exposed to a vapor-deposition chamber 201.

Figure 6:
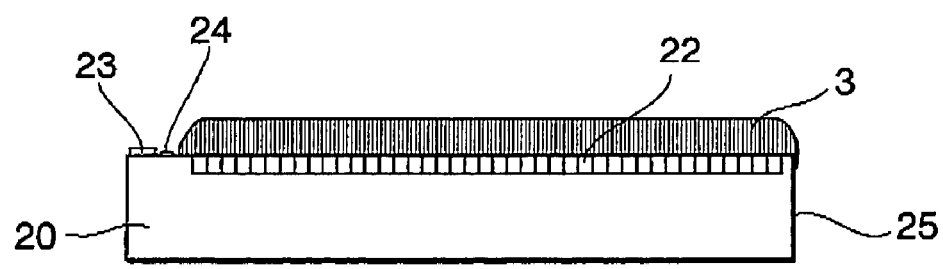

The vapor-deposition-substrate holder 200 is set in an vapor deposition apparatus in this state, and CsI doped with Tl is grown as columnar crystals of about 250 μm in thickness on the light receiving section 22 of the solid-state image sensing device 2 according to a vacuum deposition method, so as to form a layer of the scintillator 3 (see FIG. 6). Around the light receiving section 22 of the solid-state image sensing device 2 disposed in the vapor-deposition-substrate holder 200, only the projection 200a exists as a portion projecting from the light receiving section 22 toward the vapor-deposition chamber 201, and therefore the layer of the scintillator 3 is formed successively toward the projection 200a, i.e., up to the sidewall 25 excluding the electrode pad 23. As a result, it is possible to form a layer of the scintillator 3 almost uniform in thickness extending to the edge part of the photoelectric detector 21 close to the sidewall 25.

Figure 7:
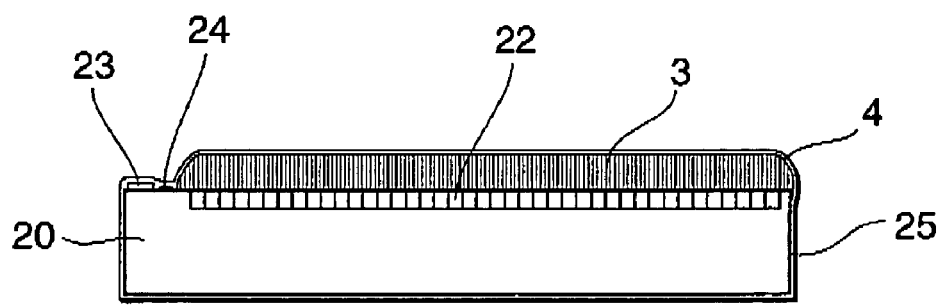

Since CsI has high hygroscopicity and will be dissolved while absorbing the water vapor of the air if it remains exposed, the whole of the solid-state image sensing device 2 where the scintillator 3 is formed is wrapped with 10 μm-thick Parylene according to a CVD (chemical vapor deposition) method as shown in FIG. 7, and a protective film 4 is formed for its protection.

In greater detail, coating by vapor deposition is performed in a vacuum in the same way as the vacuum deposition of metal, and includes a step of subjecting a diparaxylylene monomer used as a raw material to thermal decomposition, then quickly cooling a resulting product in an organic solvent such as toluene or benzene, and obtaining diparaxylylene which is called dimer, a step of subjecting this dimer to thermal decomposition and gathering a stable radical paraxylylene gas, and a step of causing the thus generated gas to be absorbed and polymerized onto a material so as to form a polyparaxylylene film having a molecular weight of about 500,000 by polymerization.

There is a gap between the columnar crystals of CsI, and Parylene enters this narrow gap to some extent, so that the protective film 4 comes in firm contact with the layer of the scintillator 3 and seals up the scintillator 3. The Parylene coating makes it possible to form a precise thin-film coating, which is uniform in thickness, on the uneven layer surface of the scintillator 3. Under the CVD method, Parylene can be formed at a lower vacuum degree than in metal deposition and at normal temperatures, and can be easily processed.

Figure 8:
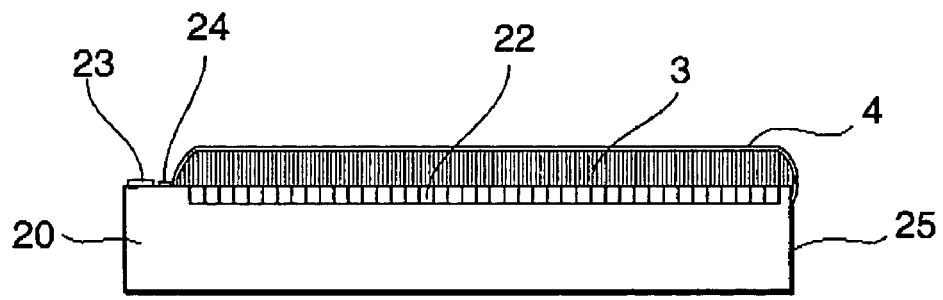

The protective film 4 formed subsequently to this is slit between the electrode pad 23 and the shift register 24 and along the outside of the sidewall 25, and the outer protective film 4 is peeled off. Thereby, the electrode pad 23 is exposed, and an image sensor panel shown in FIG. 8 is obtained.

Thereafter, a UV cured resin, for example, of 10 to 20 μm in thickness containing divinylbenzene is applied to the sidewalls 25 of the solid-state image sensing devices 2a to 2d thus formed as image sensor panels on the flat surface of the base 1 so that the sidewalls 25 butt against each other, and the cured resin is hardened in the 2×2 array of the image sensing devices with the light receiving surface of the photoelectric detector 21 as an upper face so as to dispose the electrode pads 23 outside while the light receiving sections 22 are adjacent to each other, whereby the image sensing devices 2a to 2d are bonded together and are fixed to the base 1. As a result, the radiation detector 100 shown in FIG. 1 is obtained. A circuit section electrically connected to the photoelectric detectors 21 and a bonding pad are provided between at least one of the other sides that are not adjacent to the light receiving section 22 of the image sensor panel and the light receiving section 22.

Next, the operation of this embodiment will be described with reference to FIG. 1 and FIG. 2. X rays (radiation) that have entered from an incidence surface pass through the protective film 4, and reach the scintillator 3. The X rays are absorbed by the scintillator 3, and light of a predetermined wavelength proportional to the quantity of the X rays is emitted. The emitted light reaches the photoelectric detectors 21 in the light receiving section 22. In each photoelectric detector 21, an electrical signal corresponding to the quantity of the light that has reached it is generated by a photoelectric conversion, and is stored for a fixed time. Since the quantity of the light is proportional to the quantity of the incident X rays, the electrical signal stored in each photoelectric detector 21 corresponds to the quantity of the incident X rays, and an image signal corresponding to an X-ray image can be obtained. The image signals stored in the photoelectric detectors 21 are successively output from each electrode pad 23 through the shift register 24 from a signal line not shown, are then transferred outward, and are processed by a predetermined processing circuit, whereby an X-ray image can be displayed on a monitor.

The solid-state image sensing device 2 that is an image sensor panel according to the present invention has a uniform layer of the scintillator 3 extending to the edge of the light receiving section 22. Additionally, the light receiving sections of the solid-state image sensing devices 2 can be disposed adjacent to each other, and therefore a dead space that is an insensible field between the solid-state image sensing devices 2 can be controlled to the width of one to three pixels, and effective use can be made to the edge of the light receiving section 22.

Figure 9:
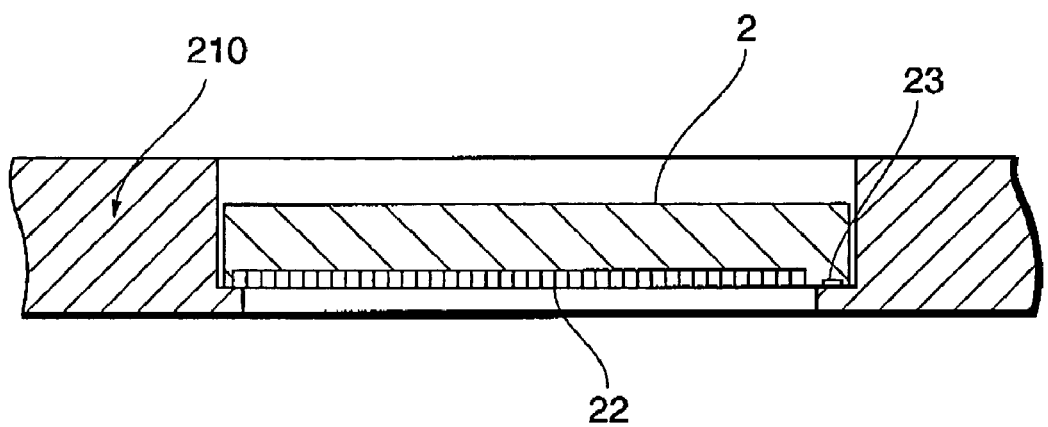
FIG. 9 and FIG. 10 are views for explaining a conventional vapor-deposition-substrate holder.
Figure 10:
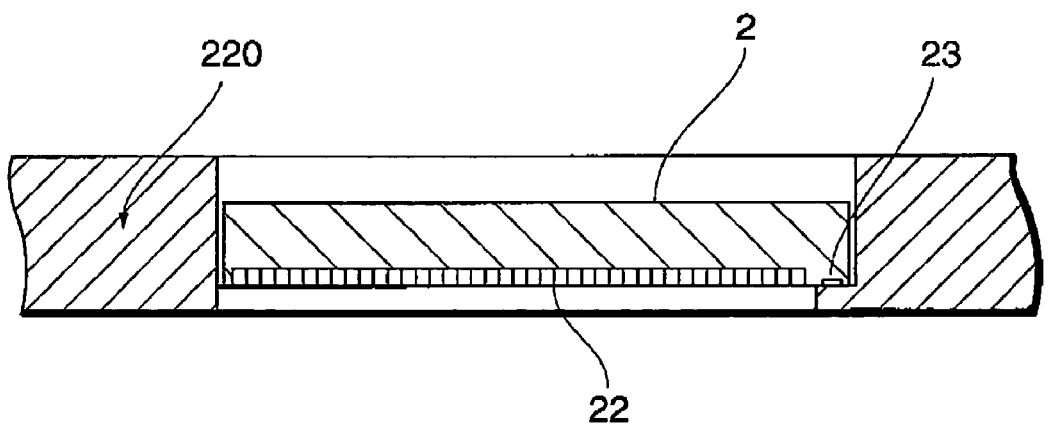
Figure 11:
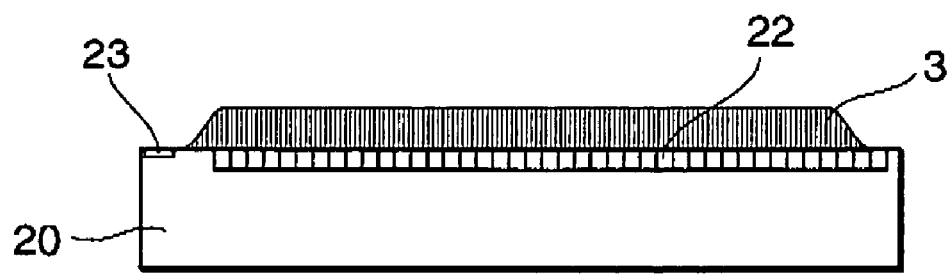
FIG. 11 and FIG. 12 are sectional views showing a scintillator layer produced by the vapor-deposition-substrate holder of FIG. 9 and FIG. 10, respectively.
Figure 12:
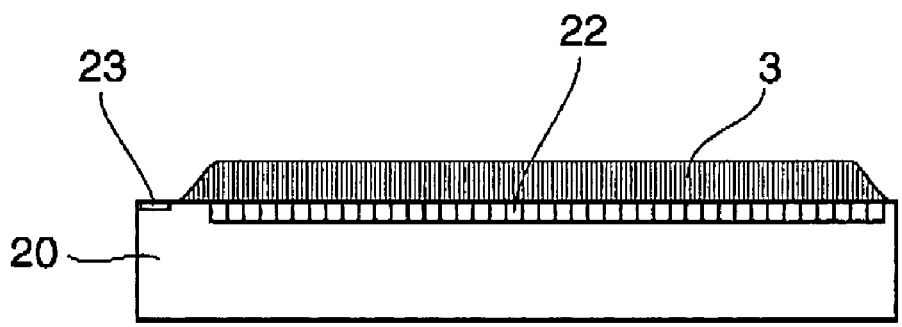

In contrast, if the scintillator 3 is formed on the solid-state image sensing device 2 by use of the vapor-deposition-substrate holders 210 and 220 shown in FIG. 9 and FIG. 10, the scintillator 3 cannot be sufficiently formed at the edge of the light receiving section 22 as shown in FIG. 11 or FIG. 12. Therefore, in spite of the fact that the solid-state image sensing devices 2 are disposed as close to each other as possible, a dead space is inevitably generated between the solid-state image sensing devices 2, and, in addition, the layer of the scintillator 3 is insufficient. Therefore, an area that cannot obtain a sufficient quantity of light arises to the extent of several pixels to tens of pixels, and an unnegligible dead space (insensible field) will be generated. According to the present invention, the width of such an insensible field can be made small enough to be negligible.

Further, according to the present invention, since the protective film 4 extends to the sidewall 25 and, in addition, the sidewall 25 is fixed with resins, the scintillator 4 can be effectively prevented from separating, and its durability can be secured. Further, since detectors with a small light receiving screen are combined together, the yield for each component can be prevented from decreasing greater than a case where large-screen detectors are manufactured, and production costs can be reduced.

Figure 13:
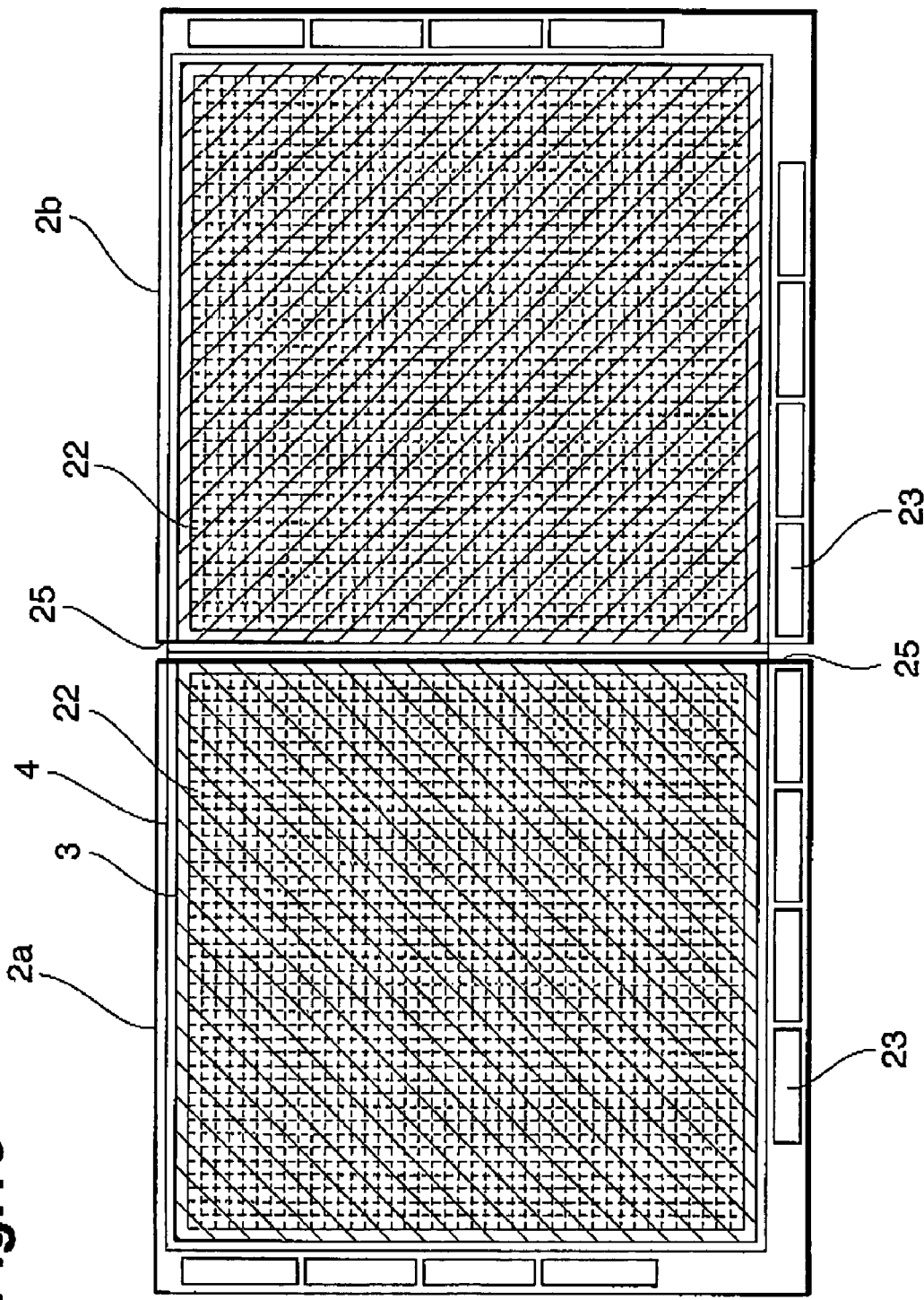
FIG. 13 is a sectional view showing a second embodiment of the radiation detector according to the present invention.
Figure 14:
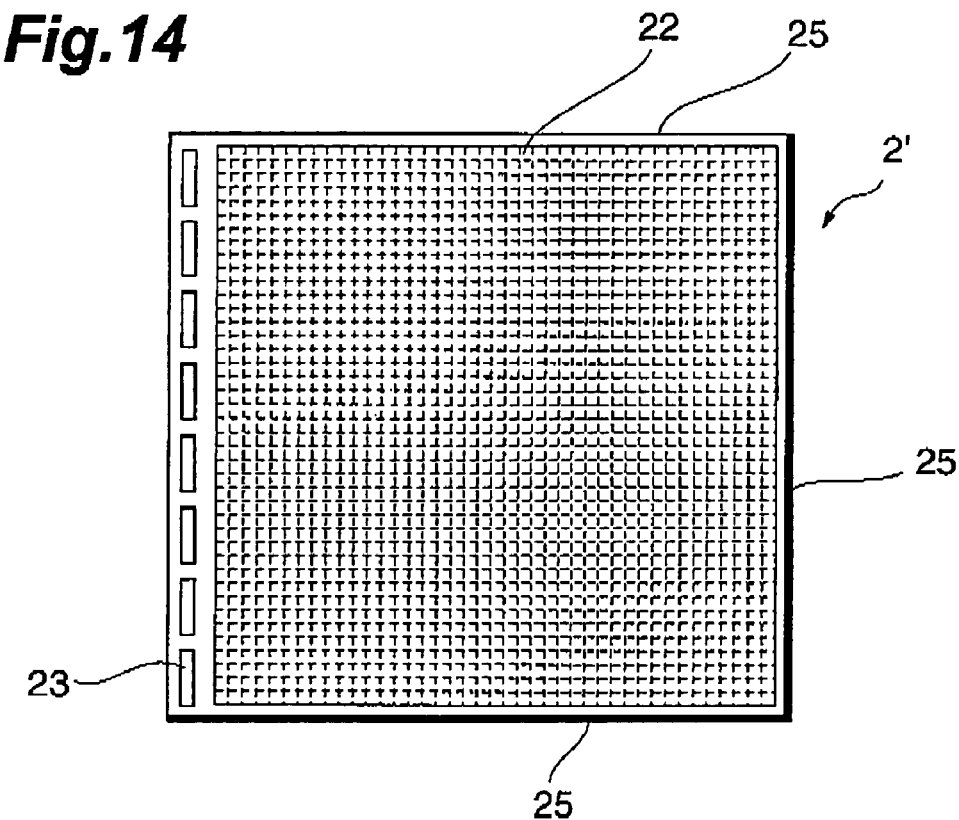
FIG. 14 and FIG. 15 are plan views, each showing the shape of a solid-state image sensing device used in another embodiment of the radiation detector according to the present invention.
Figure 15:
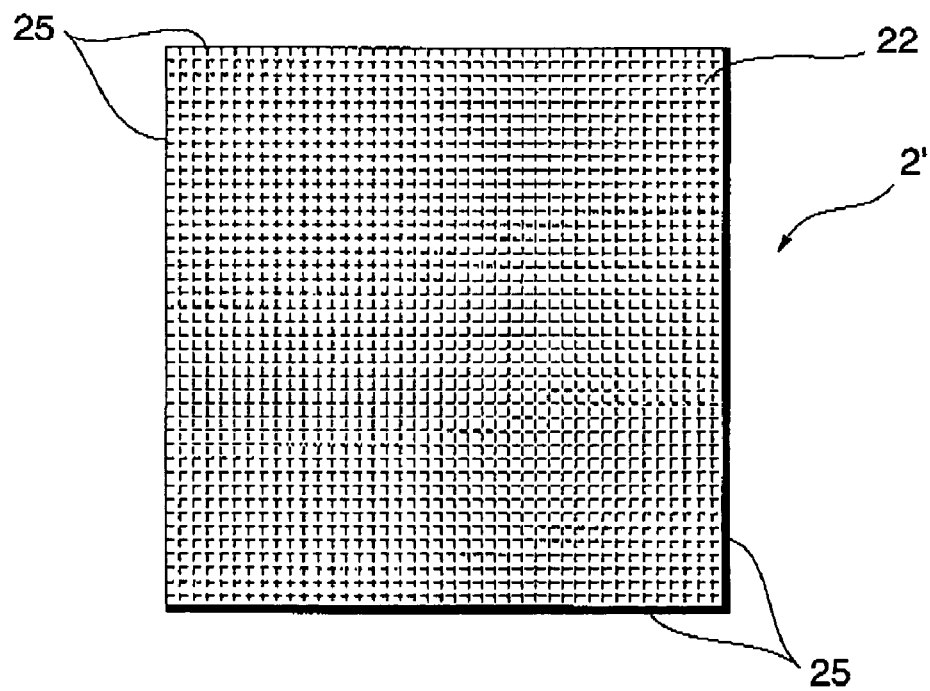

FIG. 13 is a plan view showing a second embodiment of the radiation detector according to the present invention. As shown in this figure, the solid-state image sensing devices 2a and 2b that are two image sensor panels may be coupled together to manufacture a radiation detector with a large screen. Further, it is allowable to arrange three or more solid-state image sensing devices in a row so as to make a large screen or arrange them in 2×m array or in m×n array for a large screen. If the solid-state image sensing devices are arranged in 2×m array (where m is 3 or an integer greater than 3), solid-state image sensing devices 2' other than the image sensing device disposed at at least four corners are required to have a structure (see FIG. 14) in which the light receiving section 22 is disposed up to the boundary of at least three sides. If the solid-state image sensing devices are arranged in m×n array (where m and n are each 3 or an integer greater than 3), solid-state image sensing devices 2" disposed at the inner part excluding the peripheral part are required to have a structure (see FIG. 15) in which the light receiving section 22 is disposed on the entire surface. In this case, it is preferable to dispose the electrode pad on the back face and read a signal by the use of a wire passing through the base 1. It is, of course, obvious that each of the aforementioned solid-state image sensing devices can be used as an individual detector.

Figure 16:
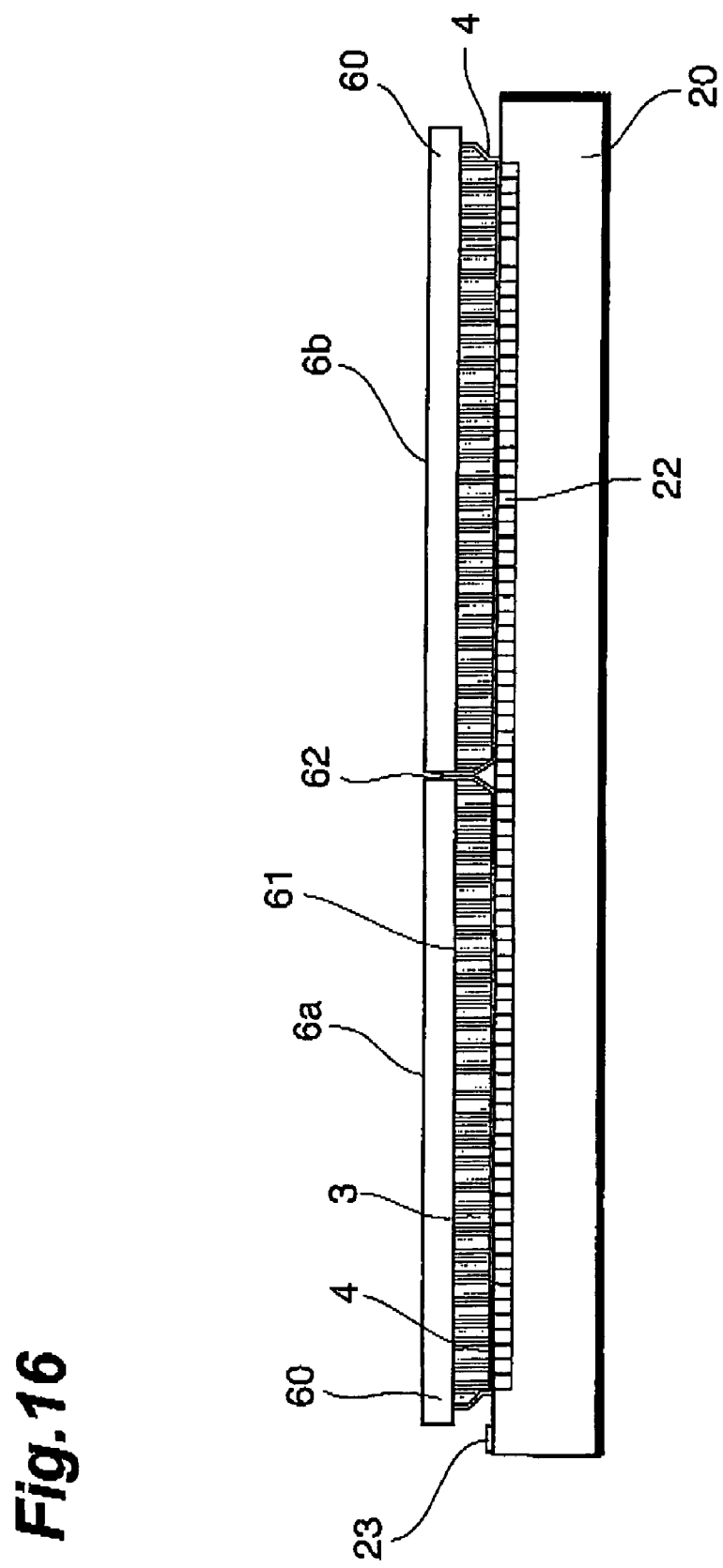
FIG. 16 is a sectional view showing a third embodiment of the radiation detector according to the present invention.

FIG. 16 is a sectional view showing a third embodiment of the radiation detector according to the present invention. Scintillator panels 6a and 6b according to the present invention are disposed on the solid-state image sensing devices 2. In each scintillator panel 6, the scintillator 3 successively extends from one side face 61 of a glass board 60, which serves as a scintillator-forming substrate, toward the sidewall 62, and a protective film 4 of Parylene is formed so as to cover and wrap the scintillator 3. The scintillator panels 6a and 6b are disposed on the light receiving section 22 of one solid-state image sensing device 2 in a state where the sidewalls 62 butt against each other, and a side where the scintillator 3 is formed is directed to the solid-state image sensing device 2.

Since a method for manufacturing the scintillator panel 6 follows the steps shown in FIG. 4 to FIG. 8, a description thereof is omitted. When this scintillator panel 6 is used, the same effect as the radiation detector of the first embodiment can be obtained. Not only on the side of the scintillator panel 6 but also on the side of the solid-state image sensing device 2, a plurality of solid-state image sensing devices may be combined like a panel. If the scintillator side of the scintillator panel is directed to the light receiving section of the solid-state image sensing device, the board 60 forming the scintillator needs to be radiolucent. Al- or Be made board, instead of glass, or a material mainly composed of carbon, such as amorphous carbon or graphite, can be used as a radiolucent board.

If the side of the board 60 of the scintillator panel is directed to the light receiving section of the solid-state image sensing device, the board needs to be transmissible to light emitted from the scintillator, and glass to be penetrated by visible light is preferred when CsI is used as the scintillator.

In the foregoing description, the protective film 4 is a Parylene-made protective film having a single film structure. However if a reflection film that is a thin surface of the Parylene-made film in the first and second embodiments, an image with high brightness can be obtained by returning the light emitted from the scintillator 3 to the photoelectric detector 21. Further, in the third embodiment, an image with high accuracy can be obtained by providing a reflection film between the radiolucent board and the scintillator. In the first and second embodiments, a Parylene film, for example, may be applied onto the surface of the metallic thin film for the protection of the metallic one. When a moisture-proof material is used as the scintillator 3 or when the whole of the device is contained in a moisture-proof protective case, the protective film 4 is not needed.

INDUSTRIAL APPLICABILITY

The radiation detector and the scintillator panel according to the present invention can be suitably used as a radiation detector and a scintillator panel to get a radiation image having a large area.

What is claimed is:

1. A radiation detector comprising:
   an image sensor panel having a substrate and a light receiving section consisting of a plurality of detectors two-dimensionally arranged in the vicinity of at least one side on the substrate, and
   a scintillator formed by vapor deposition from a surface of the light receiving section of the image sensor panel to a sidewall part in the vicinity thereof
   wherein the image sensor panel is provided in a plurality, and each of the image sensor panels is fixed by disposing sidewalls where the scintillator is formed so as to be adjacent to each other, and
   wherein resulting scintillator portions for each image sensor panel are respectively covered with a moisture-proof protective film.

2. A scintillator panel comprising:
   a scintillator-forming substrate, and
   a scintillator formed by vapor deposition from a sidewall part of at least one side of the scintillator-forming substrate to a predetermined area of one surface of the scintillator-forming substrate
   wherein the scintillator-forming substrate is provided in a plurality, and, sidewalls where the scintillator of each of the scintillator-forming substrates is formed are disposed and fixed to be adjacent to each other, and
   wherein resulting scintillator portions for each scintillator-forming substrate are respectively covered with a moisture-proof protective film.

3. The scintillator panel according to claim 2, wherein the scintillator-forming substrate is radiolucent.

4. A radiation detector comprising:
   the scintillator panel according to claim 2, and
   an image sensor panel in which a light receiving section formed by two-dimensionally arranging photoelectric detectors is disposed to face said scintillator.

5. A method for manufacturing a radiation detector, the method comprising steps of:
   preparing one or more image sensor panels each of which has a light receiving section in which a plurality of photoelectric detectors are two-dimensionally arranged in the vicinity of at least one side of a substrate, and
   forming a scintillator by vapor deposition from a surface of the light receiving section of each of the image sensor panels to a sidewall part close to the light receiving section
   further comprising a step of fixing the plurality of image sensor panels obtained after the scintillator is formed by causing sidewalls where the scintillator is formed to be adjacent to each other.

6. The method for manufacturing the radiation detector according to claim 5, further comprising a step of covering the scintillator with a moisture-proof protective film after the scintillator is formed.

7. A method for manufacturing a scintillator panel comprising steps of:
   preparing one or more scintillator-forming substrates, and
   forming a scintillator by vapor deposition from a sidewall part of at least one side of the scintillator-forming substrate to a predetermined position of a surface of the substrate
   further comprising a step of fixing the plural scintillator-forming substrates obtained after the scintillator is formed by causing sidewalls where the scintillator is formed to be adjacent to each other.

8. The method for manufacturing the scintillator panel according to claim 7, further comprising a step of covering the scintillator with a moisture-proof protective film after the scintillator is formed.

9. A method for manufacturing a radiation detector comprising a step of disposing and fixing a light-receiving surface of a solid-state image sensing device so as to face a scintillator of a scintillator panel manufactured by the method according to any one of claims 7 to 8.

* * * * *